Feb. 3, 1959 — B. POUPET — 2,871,509
SKINNING METHOD AND APPARATUS
Filed April 10, 1956 — 4 Sheets-Sheet 1

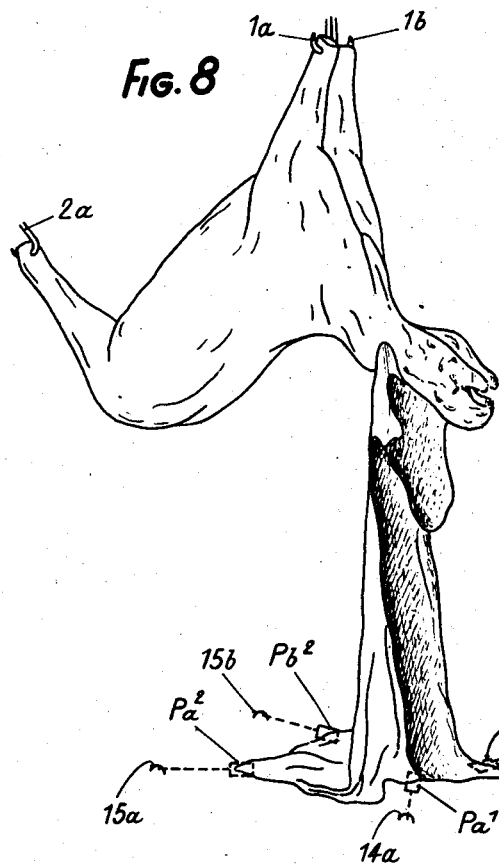
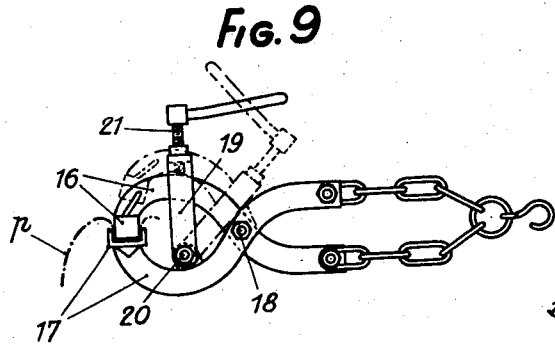
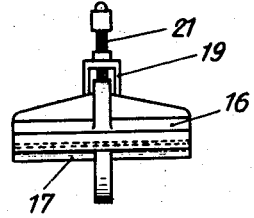

United States Patent Office 2,871,509
Patented Feb. 3, 1959

2,871,509

SKINNING METHOD AND APPARATUS

Bernard Poupet, Le Kremlin-Bicetre, France

Application April 10, 1956, Serial No. 577,252

Claims priority, application France April 13, 1955

8 Claims. (Cl. 17—45)

The skinning of slaughtered animals, particularly of horses, is at present effected by the following method:

The pelt of the animal is slit longitudinally on the underside of the body and also on the inner side of each of the four limbs, the four last-mentioned slits running into the longitudinal slit. By means of a knife, the pelt of the limbs is completely detached and the pelt of the belly is partially detached on both sides of the longitudinal slit. The pelt at the belly is then seized on one side by an operator and strongly tensioned, while another operator hits the tensioned pelt with a beetle so as to loosen it from the body of the animal, and the same operation is effected on the other side. This work requires much time and sustained efforts of the two operators, and the pelt is likely to be damaged by the strokes of the beetle. Furthermore, the body of the animal must be displaced several times.

The pelt of the neck is detached from the flesh by cutting the latter slightly with a knife, which requires much time and furthermore the pelt is often cut at many places, so that the neck portion of the pelt bears very distinct marks made by the very numerous and necessarily close-set knife cuts.

The skinning of oxen is effected in the same manner, or by means of tools with rotary cutting blades, whose work is defective because they detach part of the flesh at the same time as the pelt, since the latter would otherwise be cut in, so that the pelt must subsequently undergo the so-called fleshing. These tools can besides not be used for skinning horses, whose pelt adheres much more strongly to the flesh than that of oxen.

The present invention relates to a method for skinning slaughtered animals which can be applied indifferently to oxen and to horses and which avoids the above mentioned drawbacks. The new method gives an absolutely perfect result in a single operation, it is much faster and above all it is much less tiring for the operators, the hitting of the pelt of the belly with a beetle being completely done away with.

The method according to the invention is essentially characterized in that, after making the usual slits, detaching the pelt from the four limbs and partially detaching the pelt of the belly on both sides of the longitudinal slit, the two edges of said longitudinal slit are fastened to the floor on opposite sides of the body of the animal, and said body is progressively lifted by exerting a vertical traction on its four limbs, until the skinning is completed.

The invention relates also to the apparatus by means of which the above defined method is carried out.

The fastening of both edges of the pelt of the belly to the ground may of course be effected by any convenient means. However, in order to ensure a strong attachment which does not damage the pelt, the fastening is preferably effected by means of clips detachably fastened to rings which are sealed in the floor on two opposite lines.

Advantageously, each of said clips has a male jaw and a female jaw, as well as locking means formed by a stirrup-piece which is pivotally mounted on one of said jaws and provided with a screw adapted to lock the clip in closed position by pressing against the other jaw.

The lifting of the animal can be effected by any convenient manually or mechanically operated lifting devices, one lifting device being provided for pulling the rear legs and another one for pulling the front legs.

The appended drawings illustrate the successive stages of the method and the apparatus used for carrying the same into effect, the apparatus being shown by way of example only.

Fig. 3 is a corresponding plan view after said fastening has been made, the lifting hooks being omitted.

Fig. 4 is a schematic sectional view taken on line IV—IV of Fig. 3.

Fig. 5 is a perspective view showing a first stage of the lifting of the animal.

Fig. 8 shows the operation near its final stage.

Figs. 9 and 10 are a side view and an end view of a clip adapted to be used for fastening the pelt to the floor.

Figure 1:
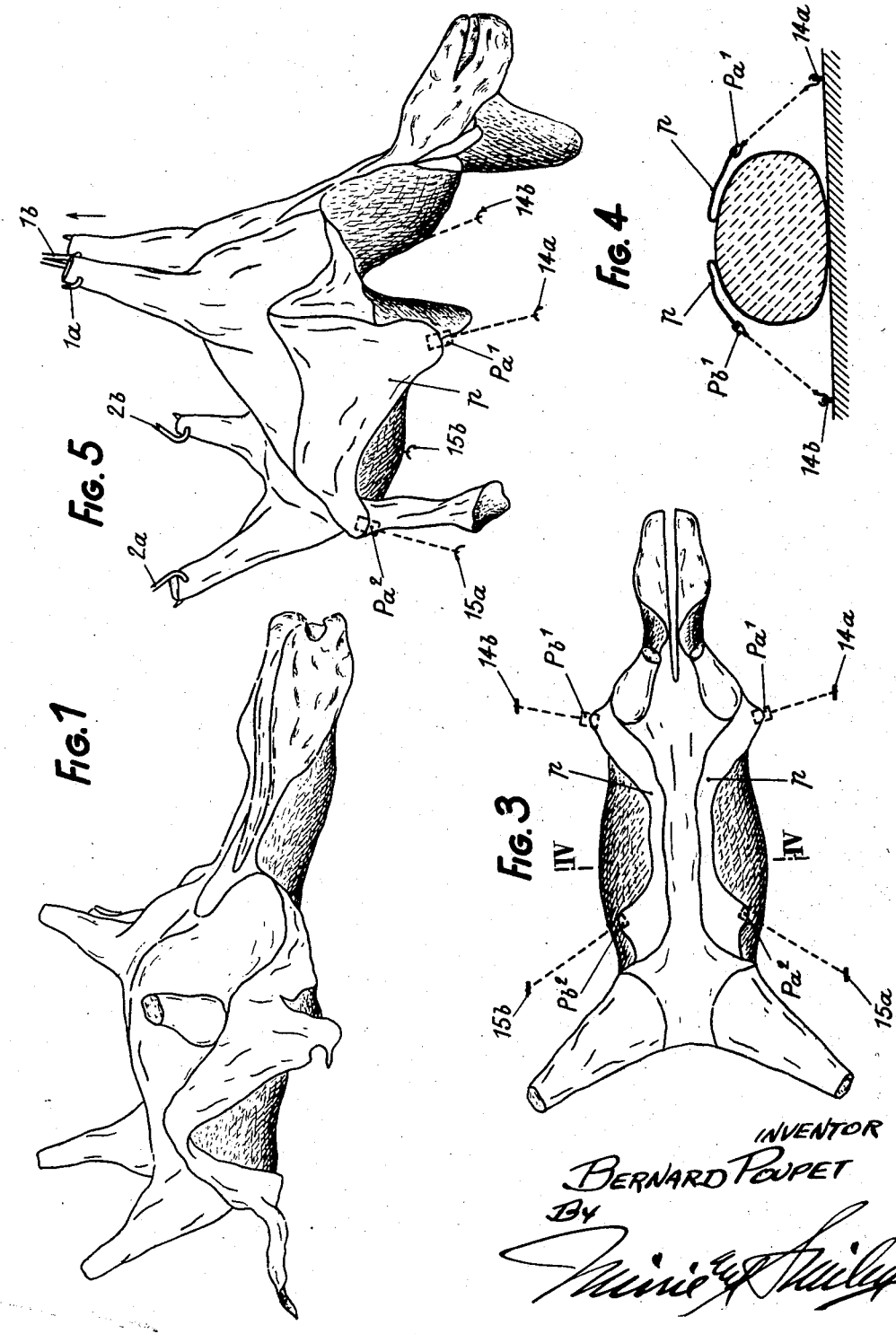
Fig. 1 is a perspective view of the animal ready for undergoing the novel steps of the method according to the invention.

In order to skin the animal, for example a horse, one first proceeds in the known manner by slitting the pelt longitudinally along the middle of the belly, the slit thus made extending from the root of the tail to the end of the snout, and four other slits are made, one on the inner side of each limb, said last mentioned slits running into the longitudinal slit. By means of a knife, the pelt is then completely detached from the four limbs and the pelt of the belly, neck and head is partially detached on a certain width on both sides of the above mentioned longitudinal slit so that the animal presents itself substantially as shown on Fig. 1.

Only at this stage begin the operations which are characteristic features of the method according to the invention.

Hooks $1a$, $1b$, $2a$, $2b$ are passed respectively in each of the skinned limbs (see Fig. 2) and the animal is suspended by these hooks in such manner that the back remains substantially in contact with the floor, that is to say, the body is not lifted from the floor, or is lifted only a few millimeters above the floor.

Figure 2:
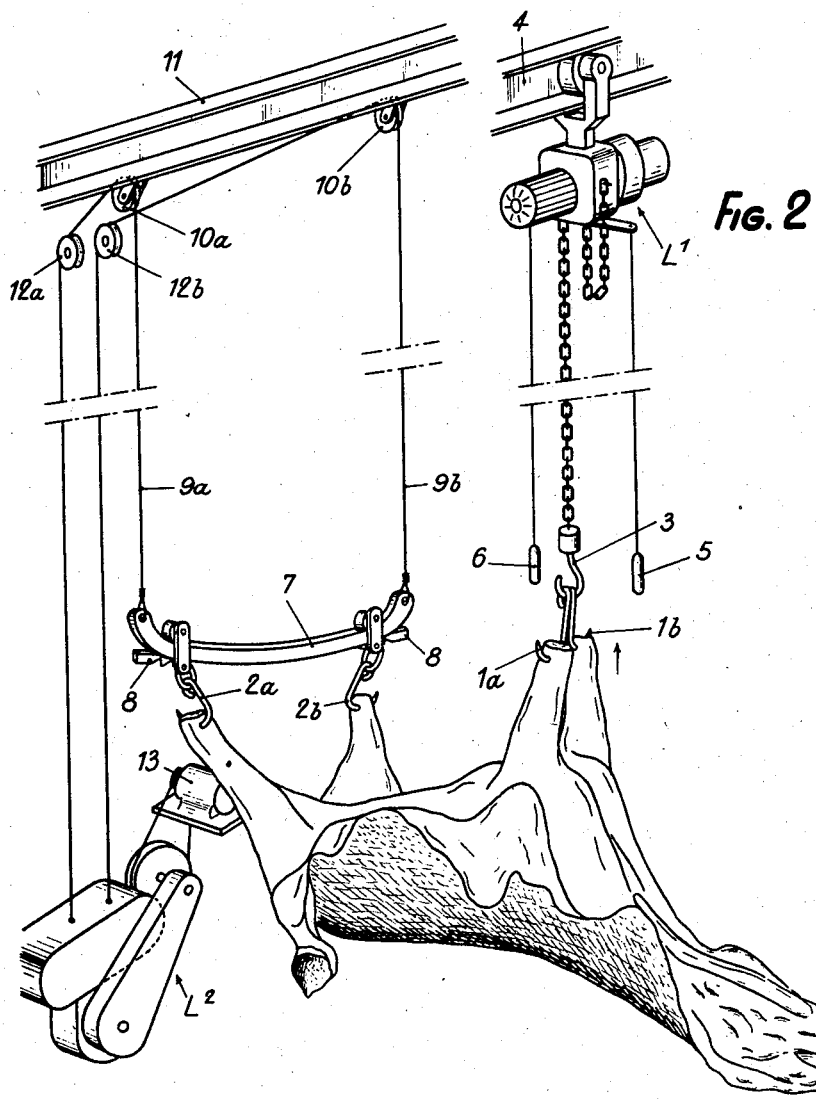
Fig. 2 is a perspective view of the suspended animal, before the two edges of the pelt of the belly are fastened to the floor.

The two hooks $1a$, $1b$, fastened to the front legs are suspended together on the hook 3 of a lifting device of any convenient type which is generally designated by the reference $L^1$ on Fig. 2. This lifting device is for example movable along a transverse rail 4 and its motor, provided with a reducing gear, can be started and stopped by means of switches controlled from the floor, through links carrying handles 5 and 6.

The rear hooks $2a$, $2b$ are preferably spread apart, so that the animal will be in position for being cut into halves once the skinning is completed. The rear hooks $2a$, $2b$ are supported by a bar 7 provided with means (for example racks 8) which make it possible to vary the distance between the hooks $2a$, $2b$ and to hold them in the chosen position. This device is generally in use for suspending skinned animals and therefore needs no further description. The bar 7 is suspended from two cables $9a$, $9b$ which pass over pulleys $10a$, $10b$ carried by a beam 11 parallel to the rail 4, then over other pulleys $12a$, $12b$, and are finally wound on the drum of another lifting device, $L^2$, which is placed on the floor and may be of the known type illustrated on the drawing, driven by an electric motor 13 through a reducing gear.

Each of the two edges $p$ of the pelt of the belly (see

Figs. 3 and 4) is then seized, preferably by clips, for example two on each side, as shown at $Pa^1$, $Pa^2$ and $Pb^1$, $Pb^2$ respectively, said clips being detachably fastened by chains and hooks or equivalent means to rings or equivalent means 14a, 15a, 14b, 15b sealed in the floor and placed on two opposite lines, all the chains being submitted substantially to the same tension.

The clips which are used may be of any convenient type which ensures a solid grip on the pelt. They may be, for example, of the type illustrated on Figs. 9 and 10, comprising a male jaw 16 and a female jaw 17 hingedly connected at 18 and a stirrup-piece 19 hingedly mounted at 20 on the jaw 17 and carrying a screw 21 which is adapted to press on the other jaw so as to lock the whole clip in its closed position (shown in full lines on Fig. 9).

Figure 7:
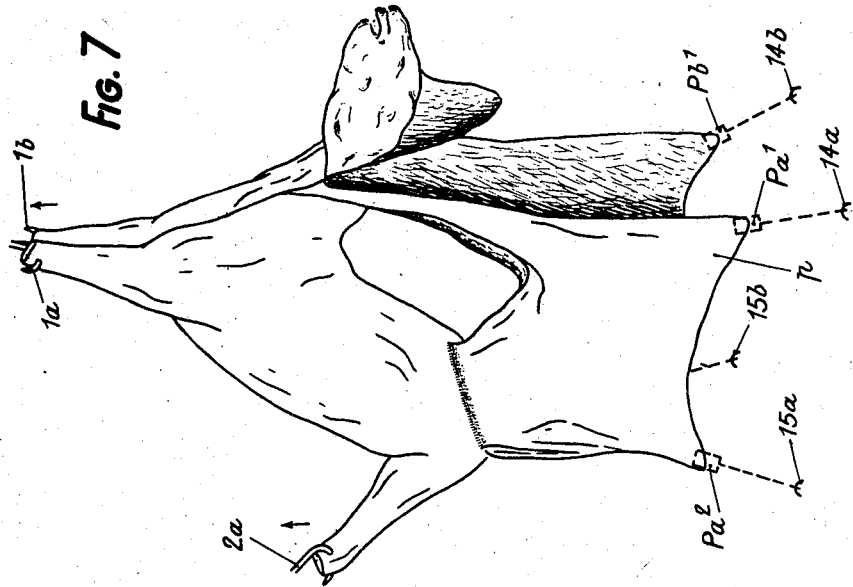
Figs. 6 and 7 are perspective views of two successive stages of the skinning operation.
Figure 6:
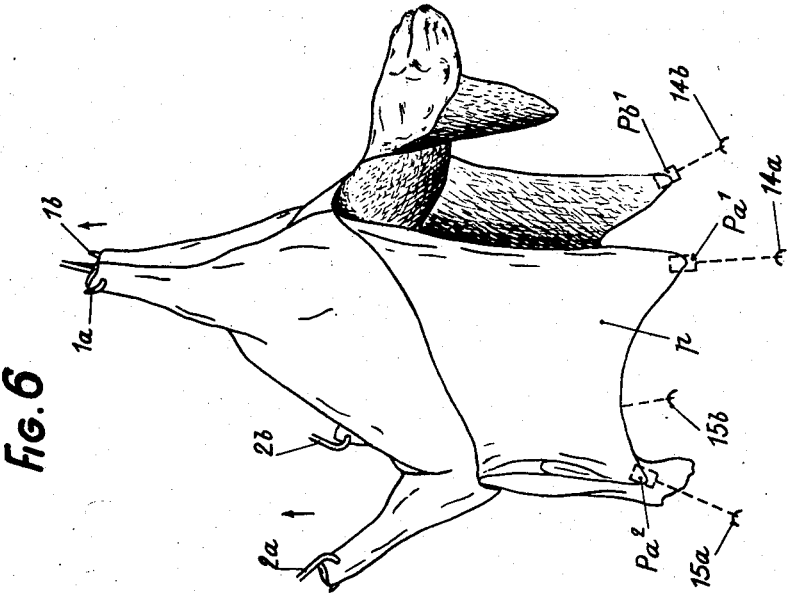

From this stage on, one proceeds substantially as follows:

First the front part of the animal is lifted as shown on Fig. 5, by means of the device $L^1$, so that the pelt is stripped from the shoulders in the direction of the fibres of the flesh. Then, while the lifting of the front part is continued, the rear part is lifted by means of the device $L^2$, so as to detach the butt (see Fig. 6). The lifting of the rear part is then stopped for a short time so as to increase the advance in height of the front part with respect to the rear part, and from this position (Fig. 7) the front and rear parts are lifted simultaneously. As soon as the front part reaches the position shown on Fig. 8, its lifting is stopped and the lifting of the rear part is continued until the rear part of the pelt is entirely detached and falls to the floor. At this moment, the device $L^2$ is also stopped and the whole is in the position shown on Fig. 8. The pelt is still slightly attached at the front, at the upper part of the head. It is then completely detached by means of a knife, but the same result could also be obtained by an additional lift given to the front part of the animal.

It will be understood that the invention is not limited to the embodiment which has been described and shown and that the method can be carried out not only by the apparatus which has been described and illustrated, but also by any other convenient means.

I claim:

1. A method for removing a pelt from an animal carcass, especially that of large animals such as horses, cattle and the like, comprising slitting a pelt longitudinally medially of the underside of a carcass and from the medial slit along the four legs, manually loosening said pelt from the legs and a portion of the underside of the carcass on each side of the longitudinal medial slit, suspending the carcass by the forelegs and the hind legs independently, holding the loosened underside portions of the pelt at a plurality of points along each side of the carcass so as to exert a peeling action on the pelt when traction is applied to the carcass, and then pulling the carcass from the pelt by exerting a traction progressively on the fore and hind legs of the carcass.

2. A method for removing a pelt from an animal carcass, especially that of large animals such as horses, cattle and the like, comprising slitting a pelt longitudinally medially of the underside of a carcass and from the medial slit along the four legs, manually loosening said pelt from the legs and a portion of the underside of the carcass on each side of the longitudinal medial slit, suspending the carcass by the forelegs and the hind legs independently, holding the loosened underside portions of the pelt at a plurality of points along each side of the carcass so as to exert a peeling action on the pelt when traction is applied to the carcass, and then lifting the carcass from the pelt by exerting a traction progressively on the fore and hind legs of the carcass.

3. A method for removing a pelt from an animal carcass, especially that of large animals such as horses, cattle and the like, comprising slitting a pelt longitudinally medially of the underside of a carcass and from the medial slit along the four legs, manually loosening said pelt from the legs and a portion of the underside of the carcass on each side of the longitudinal medial slit, suspending the carcass by the forelegs and the hind legs independently, holding the loosened underside portions of the pelt at two points on each side of the carcass respectively adjacent the fore and hind legs so as to exert a peeling action on the pelt when traction is applied to the carcass, and then pulling the carcass from the pelt by exerting a traction progressively on the fore and hind legs of the carcass.

4. A method for removing a pelt from an animal carcass, especially that of large animals such as horses, cattle and the like, comprising slitting a pelt longitudinally medially of the underside of a carcass and from the medial slit along the four legs, manually loosening said pelt from the legs and a portion of the underside of the carcass on each side of the longitudinal medial slit, suspending the carcass by the forelegs and the hind legs independently, holding down the loosened underside portions of the pelt at a plurality of points along each side of the carcass so as to exert a peeling action on the pelt when traction is applied to the carcass, lifting the carcass from the pelt by exerting a traction on the forelegs of the carcass to strip the pelt from the shoulders in the direction of the fibers of the flesh, and then lifting both the fore and hind legs simultaneously to strip the pelt from the carcass.

5. A method for removing a pelt from an animal carcass, especially that of large animals such as horses, cattle and the like, comprising slitting a pelt longitudinally medially of the underside of a carcass and from the medial slit along the four legs, manually loosening said pelt from the legs and a portion of the underside of the carcass on each side of the longitudinal medial slit, independently holding the forelegs and the hind legs of the carcass, holding the loosened underside portions of the pelt at a plurality of points along each side of the carcass so as to exert a peeling action on the pelt when traction is applied to the carcass, pulling the carcass from the pelt by exerting a traction on the forelegs of the carcass until the pelt is stripped from the sides of the shoulders, exerting a traction on both the fore and hind legs simultaneously until the pelt is stripped from the sides, exerting a traction on the forelegs only until the pelt is stripped from over the shoulders, exerting a traction on both the fore and hind legs simultaneously until the pelt is stripped from the back and neck, and finally removing the pelt from the upper part of the head.

6. A method for removing a pelt from an animal carcass, especially that of large animals such as horses, cattle and the like, comprising slitting a pelt longitudinally medially of the underside of a carcass and from the medial slit along the four legs, manually loosening said pelt from the legs and a portion of the underside of the carcass on each side of the longitudinal medial slit, suspending the carcass by the forelegs and the hind legs independently, holding down the loosened underside portions of the pelt at a plurality of points along each side of the carcass so as to exert a peeling action on the pelt when traction is applied to the carcass, lifting the carcass from the pelt by exerting a traction on the forelegs of the carcass until the pelt is stripped from the sides of the shoulders, lifting both the fore and hind legs simultaneously until the pelt is stripped from the sides, lifting the forelegs only until the pelt is stripped from over the shoulders, lifting both the fore and hind legs simultaneously until the pelt is stripped from the back and neck, and finally removing the pelt from the upper part of the head.

7. In the art of skinning large animals, such as horses, cattle and the like, the hide being first manually slit along the underside and legs thereof, an apparatus for completing the removal of a pelt from the carcass of the animal, comprising, in combination, means defining a work surface having a plurality of spaced anchors secured thereto, a plurality of clips for gripping the pelt, means fastening said clips to the anchors respectively, two lifting devices arranged in spaced parallel relation to each other above said work surface, a pair of front hooks for attachment to the forward limbs of the animal, a single member connecting said hooks to one of the lifting devices, a pair of rear hooks for attachment to the rear limbs of the animal, a bar supporting said rear hooks, means on said bar for varying the distance between the said rear hooks to spread the rear limbs apart, separate cables connecting the ends of the bar to the second one of the lifting devices, and power means for operating the lifting devices for selectively applying traction to the front and rear parts of the carcass to exert a peeling action on the pelt until the skinning is completed.

8. The device as set forth in claim 7, wherein each of said clips includes a male jaw, a female jaw, a stirrup-piece pivotally mounted on one of said jaws, and means engaging said stirrup-piece and adapted to press against the other jaw to lock the clip in closed position.

References Cited in the file of this patent

UNITED STATES PATENTS

| | | |
|---|---|---|
| 677,566 | Eaton | July 2, 1901 |
| 1,511,471 | Holmes et al. | Oct. 14, 1924 |
| 2,493,707 | Weber | Jan. 3, 1950 |
| 2,494,138 | De Moss | Jan. 10, 1950 |
| 2,696,633 | Hincks | Dec. 14, 1954 |